UNITED STATES PATENT OFFICE.

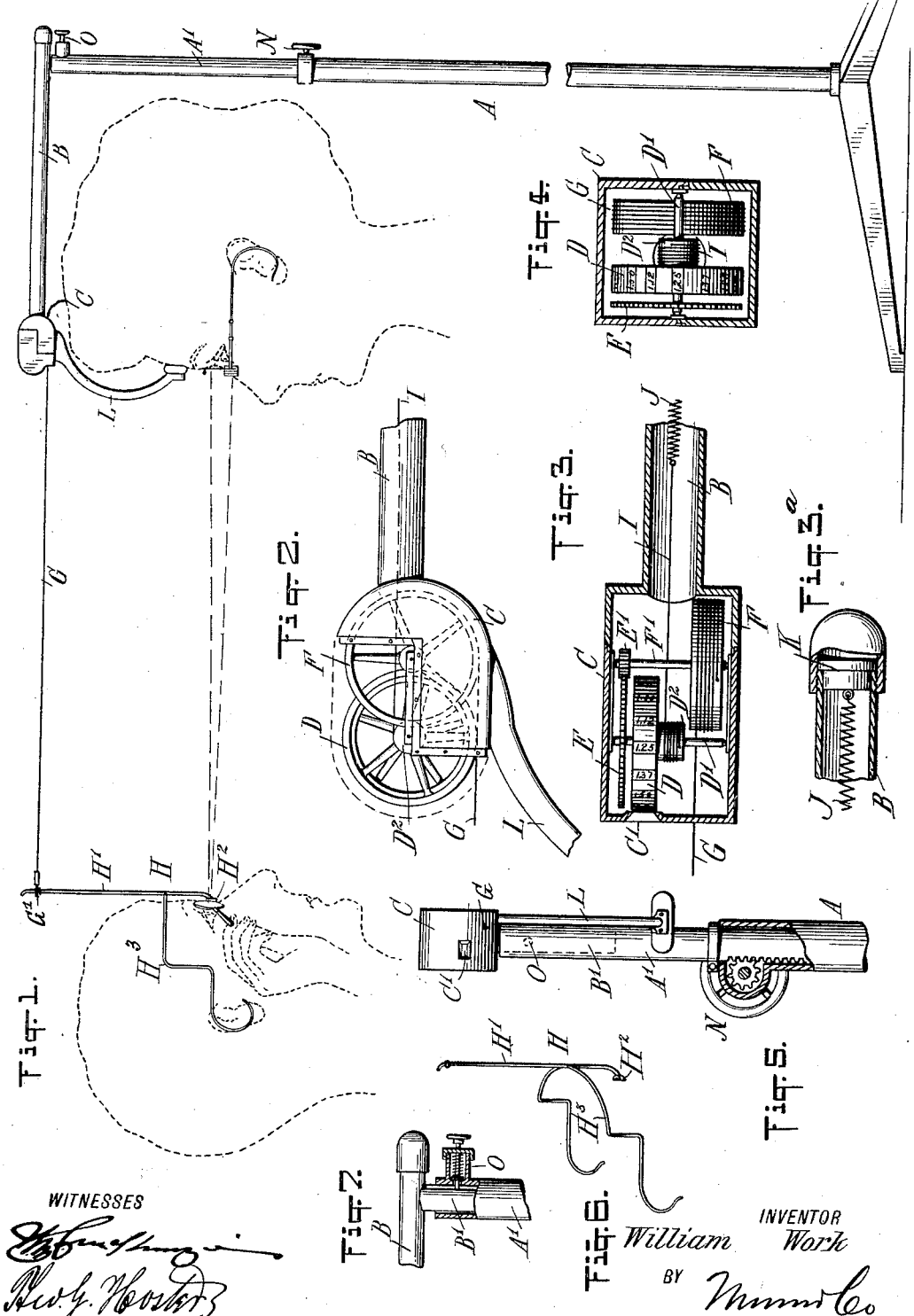

WILLIAM WORK, OF BROCKTON, MASSACHUSETTS, ASSIGNOR OF ONE-HALF TO HERMAN S. HEWETT, OF BROCKTON, MASSACHUSETTS.

OPTICAL INSTRUMENT.

1,088,507. Specification of Letters Patent. Patented Feb. 24, 1914.

Application filed August 13, 1913. Serial No. 784,547.

*To all whom it may concern:*

Be it known that I, WILLIAM WORK, a subject of the King of Great Britain, and a resident of Brockton, in the county of Plymouth and State of Massachusetts, have invented a new and Improved Optical Instrument, of which the following is a full, clear, and exact description.

The object of the invention is to provide a new and improved optical instrument to be used in conjunction with a plano-retinoscope, and arranged to permit of quickly and accurately determining the amount of refraction of the eye of a patient under observation by an oculist or other examiner, to insure fitting the patient with eyeglasses or spectacles having correct spherical, cylindrical or compound lenses.

In order to accomplish the desired result use is made of an indicator and movable actuating means connected with the said indicator and controlled by the examiner during the use of the plano-retinoscope.

A practical embodiment of the invention is represented in the accompanying drawings forming a part of this specification, in which similar characters of reference indicate corresponding parts in all the views.

Figure 1 is a side elevation of the optical instrument as applied; Fig. 2 is an enlarged side elevation of part of the instrument with the cover of the casing removed; Figs. 3 and 3ª are sectional plan views of the same; Fig. 4 is a cross section of the same; Fig. 5 is a front elevation of the instrument with the adjusting means for the stand shown in section; Fig. 6 is a perspective view of the head frame for the examiner; and Fig. 7 is an enlarged sectional side elevation of the adjusting and locking device for the horizontal tubular arm of the stand.

The improved optical instrument is mounted on a suitably constructed stand A provided on its top with a horizontal tubular arm B supporting at its forward end a casing C in which is journaled the transversely-extending shaft D' of an indicating wheel D, provided on its peripheral face with numerals indicating diopters. The diopter numerals are adapted to be successively read through an opening C' arranged in the front of the casing C on rotating the wheel D, as hereinafter more fully explained. On the shaft D' of the indicating wheel D is secured a gear wheel E in mesh with a pinion E' secured on the transversely-extending shaft F' of a drum F arranged within the casing C. On the drum F winds and unwinds a cord G extending through an opening in the front of the casing C and having its outer end provided with a ring G' adapted to be engaged with a rod H' forming part of a head frame H adapted to be attached to the head of the oculist or other examiner. The lower end of the rod H' is provided with a bridge $H^2$ adapted to be seated on the nose of the examiner, and the rod H' is also provided with temples $H^3$ adapted to engage the ears of the examiner to securely hold the head frame H in position on the examiner's head. The ring G' is engaged with the rod H' higher up or farther down to hold the cord G in an approximately horizontal position when the device is in use. A second cord I winds and unwinds on the hub $D^2$ of the indicating wheel D, and the said cord I extends rearwardly through the casing C into the tubular arm B, and the rear end of the said cord I is attached to one end of a spring J secured at its rear end to a plug K held in the rear end of the tubular arm B.

The cords G and I are so arranged that when the examiner moves his head, with the frame H attached thereto, away from the casing C then the cord G unwinds from the drum F which is thereby rotated so as to rotate the indicating wheel D which in turn winds up the cord I against the tension of its spring J. When the examiner moves his head toward the casing C the wheel D is turned in the reverse direction by the action of the spring-pressed cord I whereby the cord G is wound up on the drum F now rotated from the wheel D.

On the casing C is secured a depending head rest L adapted to abut against the forehead of the patient to be examined, as will be readily understood by reference to Fig. 1.

The stand A is preferably provided with an extension telescoping section A' controlled by a raising and lowering device N in the form of a rack and pinion, to allow of raising or lowering the head rest L to suit the height of the patient to be examined.

The tubular arm B is preferably provided with a depending shank B' fitting into the extension section A' of the stand, and the said shank B' is provided with a vertical groove engaged by a spring-pressed pin O mounted on the section A' to hold the arm B against lateral movement.

In using the instrument the patient is equipped with the ordinary trial frame, and the examiner is provided with a plano-retinoscope to enable him to examine the patient's eye relative to any defect in refraction (see Fig. 1). The patient is preferably seated on a chair in front of the stand A with the forehead abutting against the head rest L. The frame H is attached to the examiner's head, as previously mentioned, and the examiner now moves his head toward or from the patient until he observes that the shadow has no movement in any one direction. It will be noticed that when the examiner moves his head away from that of the patient the cord G is drawn out to rotate the drum F and the wheel D, and when the examiner moves the head toward the patient the wheel D is rotated in the reverse direction by the action of the spring-pressed cord I, and the cord G is unwound from the drum F as the latter is rotated from the wheel D. Now as soon as the examiner has determined the defect of refraction of the patient's eye as above mentioned he can read at a glance the corresponding diopter numeral appearing in the opening C'.

In case the defect requires a plus lens or a weaker or stronger minus than the range of the instrument −1.00 to −3.50, a lens may be put into the trial frame worn by the patient so as to bring the defect within range of the instrument. When the instrument is in use and the forehead of the patient rests on the head rest L then the eye of the patient is approximately in vertical alinement with the opening in the casing C through which the cord G passes. The cord G is of such a length that when the retinoscope held by the examiner is one meter from the eye of the patient the dioptric numeral 1.00 on the indicating wheel D will show through the opening C' in the casing C; when the retinoscope is half a meter from the eye of the patient 2.00 will show in the opening C', and so on in proportion with all the other numerals on the wheel D. Now when the examiner moves his head away from the patient's head the cord G is drawn out to cause a rotation of the drum F and the wheel D so that the latter displays successively the diopter numerals, and when the examiner has determined the defective refraction of the patient's eye the diopter numeral appearing in the opening C' indicates the amount of such defective refraction of the patient's eye.

The instrument shown and described has a range of between −1.00 and −3.50 diopters and the desired result is obtained without requiring continued changing of lenses in the trial frame of the patient, as heretofore practised.

Having thus described my invention, I claim as new and desire to secure by Letters Patent:

1. An optical instrument of the class described and to be used in conjunction with a retinoscope, comprising a registering device for indicating diopters, and an actuating means connected with the said registering device for actuating the same according to the distance between the examiner and the patient examined by the examiner.

2. An optical instrument of the class described and to be used in connection with a retinoscope, comprising a registering device for indicating diopters and provided with a drum and cord winding and unwinding on the said drum, and a frame for attachment to the examiner's head and connected with the said cord to actuate the registering device according to the distance between the examiner and the patient examined by the examiner.

3. An optical instrument, comprising a stand provided with a head rest for the patient to be examined, an indicating wheel mounted on the said stand, a drum mounted on the stand and geared with the said wheel, a cord winding on the said drum for turning the drum and wheel in one direction on moving the cord, a spring device for turning the wheel and drum in the opposite direction to wind up the cord, and a head frame for attachment to the examiner's head and connected with the outer end of the said cord.

4. An optical instrument, comprising a stand provided with a head rest for the person to be examined, an indicating wheel mounted on the said stand, a drum mounted on the stand and geared with the said wheel, a cord winding on the said drum for turning the drum and wheel in one direction on unwinding the cord, a spring device for turning the wheel and drum in the opposite direction to wind up the cord, and a head frame having a rod terminating in a nose bridge and secured to the said cord and having temples for engagement with the ears of the examiner.

5. An optical instrument to be used in conjunction with a retinoscope, comprising a stand provided with a horizontal tubular arm carrying a casing at its forward end, the casing having an opening, an indicating wheel journaled in the casing and provided at its peripheral face with numerals indicating diopters and adapted to appear in the said casing opening on rotating the wheel, a drum journaled in the casing, a gearing connecting the drum with the said wheel, a cord winding on the said drum, a head frame for attachment to the examiner's head and connected with the outer end of the said cord to turn the drum and wheel in a forward direction, and a spring device connected with the said wheel to turn the latter and the drum in a return direction.

6. An optical instrument to be used in conjunction with a retinoscope, comprising a stand provided with a horizontal tubular arm carrying a casing at its forward end, the casing having an opening, an indicating wheel journaled in the casing and provided at its peripheral face with numerals indicating diopters adapted to appear in the said casing opening on rotating the wheel, a drum journaled in the casing, a gearing connecting the drum with the said wheel, a cord winding on the said drum, a head frame for attachment to the examiner's head and connected with the outer end of the said cord to turn the drum and wheel in a forward direction, a second cord winding on the hub of the said wheel and extending within the said tubular arm, and a spring connected with the said second cord and the rear end of the said arm.

In testimony whereof I have signed my name to this specification in the presence of two subscribing witnesses.

WILLIAM WORK.

Witnesses:
GEORGE E. FISHER,
FLORENCE M. KEENE.

---

Copies of this patent may be obtained for five cents each, by addressing the "Commissioner of Patents, Washington, D. C."